Figure 3:
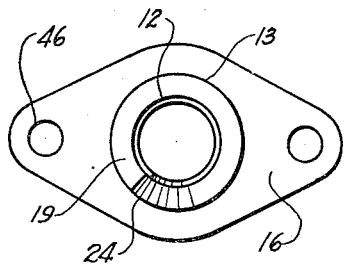

Oct. 23, 1945.   O. HAAS   2,387,257
FLANGED NUT
Filed July 26, 1944

INVENTOR.
OTTO HAAS
BY Walter S. Bleston
ATTORNEY

Patented Oct. 23, 1945

2,387,257

UNITED STATES PATENT OFFICE 2,387,257

FLANGED NUT

Otto Haas, Richmond Hill, N. Y., assignor to Aircraft Screw Products Company, Inc., Long Island City, N. Y., a corporation of New York Application July 26, 1944, Serial No. 546,590

6 Claims. (Cl. 85—32)

The invention relates to flanged nuts, i. e. to nuts for instance of the type of the so-called anchor or plate nuts or of the cap nuts having a flange connecting an inner body portion to an outer skirt-like portion. The invention contemplates the provision of nuts of the mentioned types and for purposes similar to those which the conventional one piece flanged nuts serve, wherein, however, the nut comprises two pieces, viz. a barrel or body member and a wire coil threading inserted into the barrel and secured thereto. The invention furthermore aims to provide a nut barrel of sheet metal with a wire coil threading therein so that at least the major part can be made of relatively low cost and readily workable stock material and that still the nut can be strong enough for practical purposes with the added advantages of the well-known wire coil threading.

Further objects and details of the invention will be apparent from the description given hereinafter and the accompanying drawing illustrating several embodiments thereof by way of example.

Figure 4:
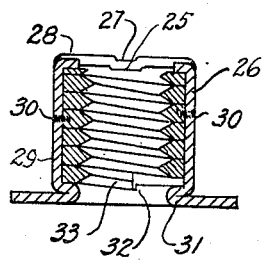
Figure 1:
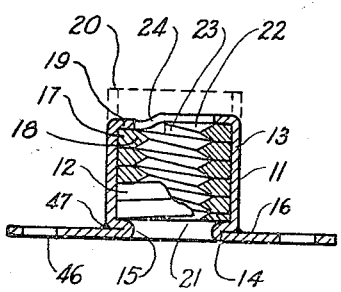
Figure 5:
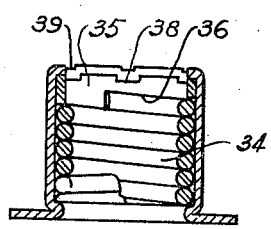
Figure 2:
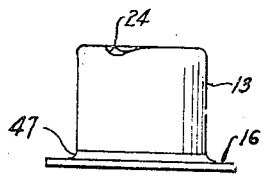
Figure 6:
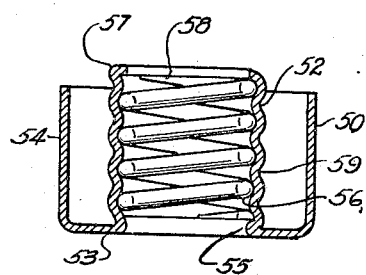

In the drawing,

Fig. 1 is a longitudinal cross-section of a plate nut according to the invention, Figs. 2 and 3 are side elevation and plan top view, respectively, thereof, Figs. 4 and 5 are longitudinal cross-sections of two modifications thereof, Fig. 6 is a longitudinal cross-section of another embodiment, Figs. 7 to 10 are diagrammatic illustrations of a nut body in various stages of perfection.

Referring now to the drawing, Figs. 1 to 3, the illustrated plate nut consists of the body member 11 and the wire coil threading or insert 12. The body 11 is made of sheet metal and comprises the cylindrical barrel portion 13 with an inner shoulder 14 formed of the material doubled back around the central hole 15 of a flange 16. The insert 12 may be coiled of a wire of any suitable cross-section, and may have or not have self-locking properties. In a barrel with a truly cylindrical inner wall, a coil wire cross-section of the illustrated shape is preferred which has an outer rectangular portion 17 with an inner triangle 18 erected on the rectangle. A coil wound of such wire has an outer cylindrical surface to fit the inner barrel wall, and adjacent coil convolutions may contact each other with relatively wide faces. However, according to the purpose and to the threading of the stud for which the nut is destined, other wire cross-sections may be used, such as e. g. the circular cross-section shown in the modification of Fig. 5. The coil 12 is inserted into the barrel from the top while the top rim 19 is still in its unfinished form shown in dash lines at 20, so that the lower end convolution 21 which may be flattened for this purpose bears on the shoulder 14. The upper end of the coil may also be flat, either entirely or only a part of it as shown at 22, and the top rim 19 of the barrel is turned inward so as to clamp the coil between the rim and the shoulder 14. Means are provided to secure the coil against turning in the barrel. For this purpose the coil end 23 is bluntly cut to constitute an abutment for an indentation 24 of the rim 19 formed in the operation by which the rim is turned from the position 19 into the position 20. It will be noticed that the size of the opening of rim 19 as well as that of the hole 15 of flange 16 is sufficient for a threaded bolt to pass through and to engage the threading constituted by the convolutions of the coil. Other means to secure the insert coil in a barrel may be used if so desired. Thus the modification of Fig. 4 shows a number of recesses 25 provided in the top face of the coil 26, indentations 27 of the top rim 28 of barrel 29 engaging the recesses 25. Either as an addition to such means or as an alternative, the barrel may be spot welded to the coil as indicated at 30. Furthermore in addition to or as an alternative, of the means described, the shoulder 31 may be recessed in its upper surface so as to form an abutment 32 for engagement by the lower coil end 33. Owing to the doubled material the shoulder is thick enough to allow such recessing. Still other means to secure a thread coil to a nut barrel are disclosed in my co-pending application filed July 8, 1944, Ser. No. 544,029. In the modification of Fig. 5 in which the wire cross-section of the coil 34 is circular, an additional ring 35 with helical bottom face 36 bears on the top of the coil. The upper face of the ring is recessed at 38 and indentations 39 of the barrel rim engage the recesses in a manner similar to that of Fig. 4. Other useful connections of that kind are disclosed in application Serial No. 544,042, filed by Dawson on July 8, 1944. Except for the mentioned differences, the modifications of Figs. 4 and 5 are similar to the embodiment of Figs. 1 to 3. This is particularly true with respect to the flanged sheet metal body of the nut.

Figure 7:
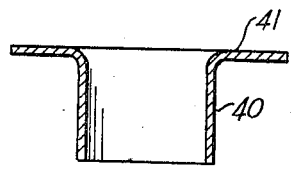
Figure 8:
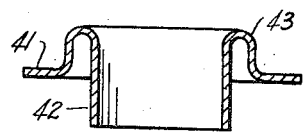
Figure 9:
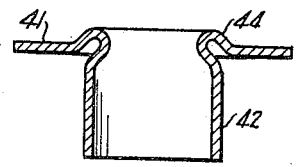
Figure 10:
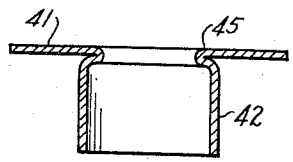

Now, in order to make a nut body of the type of the body 11, I found the following method readily applicable. Starting from a blank of sheet metal which may have any suitable contour according to the desired flange, and which is provided with a central hole of adequate size, in a first drawing operation a tubular body 40 is formed having a flange 41 at one of its ends as shown in Fig. 7. The second step of operation doubles the portion where the tubular body and flange meet, so that a single walled barrel 42 of shorter length than the tubular body 40 projects on the one side of the flange 41 whereas a double walled small tubular portion 43 projects from the other side of the flange (Fig. 8). In Fig. 9, after the third step, the cylindrical portion 43 of Fig. 8 is changed into the shape of a truncated cone 44. This cone is finally flattened as in Fig. 10 into the position 45 where the one layer of the doubling is a continuation of flange 41 and the other forms an interior shoulder of the barrel 42. Now the wire coil may be inserted and the rim turned inwardly as hereinbefore described. The rivet holes 46 shown in Figs. 1 and 3 may be provided at any time, i. e. before, during or after the drawing operation. The method just described furnishes a nut body in which the flange is somewhat thicker than the barrel wall and the inner shoulder is reinforced by doubling. It will be clear that this is consistent with the stresses actually occurring in the majority of cases where a plate nut is used. If so desired or considered necessary in particular cases, the outer barrel wall may be welded or otherwise metallically bonded to the flange as indicated at 47 in Fig. 1.

Another type of flanged nut is exemplified by the cap nut illustrated in Fig. 6. This nut also comprises a body 50 and a wire coil thread 51. The body 50 essentially consists of the barrel portion 52, the flange 53 and the skirt portion 54 which may be cylindrical or of any other suitable cross-section, as e. g. hexagonal. The barrel has the doubled shoulder 55 similar to shoulder 13 in Fig. 1 and may be similar to the barrel of the first described embodiment also in other respects. However, the different form of Fig. 6 is selected in order to illustrate certain advantages of this nut from the production view point over conventional nuts of a similar shape. The barrel 52 is provided with a helical groove 56 into which the coil 51 with spaced convolutions is screwed so as to bear on shoulder 55, and the rim 57 of the barrel is turned inward upon the end convolution 58 of the coil. There is also a helical groove 59 on the outside of the barrel, so that the wall of the barrel is substantially of equal thickness throughout.

The body 50 may be made by starting from a sheet metal blank of an outer contour and size according to the desired skirt portion 54 to be produced in a later step of operation. The blank is first drawn as hereinbefore described so that in several steps a flanged cylindrical barrel is shaped in the form of Fig. 10. Thereupon, the helical groove 59 may be rolled into the barrel outside with the result that the inner groove 56 will be formed. Then, in another drawing operation, the outer portions of the flange will be turned parallel to the barrel axis so as to produce the skirt 54. In order to complete the nut, the coil will be inserted and the rim 57 turned inward as stated hereinbefore. Thus, the nut structure according to the invention and its method of production permits certain operations on the outside of the barrel which otherwise cannot be performed or only with great difficulties, owing to the skirt encompassing the barrel.

Many modifications and alterations of the nuts herein illustrated and described will be apparent to those skilled in the art without departing from the essence and spirit of my invention which for this reason shall be limited only by the scope of the appended claims.

I claim:

1. A nut comprising a barrel and a wire coil threading, said barrel being drawn of a sheet metal blank and having a flange at one of its ends and an inwardly projecting shoulder of doubled material at the flanged end, the wire coil being inserted into said barrel so as to bear upon said shoulder and the rim of the other barrel end being turned down upon said wire coil.

2. A nut as claimed in claim 1, said rim embodying means engaging the adjacent coil end to prevent turning of the wire coil within said barrel.

3. A nut comprising a body and a wire coil threading, said body being drawn of a sheet metal blank and including a barrel and a flange with a central hole, the flange material around the hole being doubled outwardly upon the flange so as to form an inner shoulder, and the shoulder forming portion being in continuation of the barrel-forming portion of the material, the wire coil being inserted into said barrel so as to bear upon said shoulder and the rim of the other barrel end being turned down upon said wire coil.

4. A nut as claimed in claim 3, the barrel wall being impressed from the outside with a helical groove whereby inner helically projecting convolutions are formed, and said wire coil being screwed into the helical interstices between said convolutions.

5. A nut as claimed in claim 3, the barrel end adjacent said flange being metallically bonded to the latter.

6. A nut comprising a body and a wire coil threading, said body being drawn of a sheet metal blank and including a barrel and a flange portion with a central hole, the flange material around the hole being doubled outwardly upon the flange so as to form an inner shoulder, the shoulder forming portion being in continuation of the barrel forming portion of the material, and the material of the outer flange portion being turned parallel to said barrel so as to form the outer portion of a cap nut body, the wire coil being inserted into said barrel so as to bear upon said shoulder and the rim of the other barrel end being turned down upon said wire coil.

OTTO HAAS.